C. G. SÖDERLUND.
SHEET METAL BALL RETAINER FOR BALL BEARINGS.
APPLICATION FILED APR. 28, 1915.
1,196,605.
Patented Aug. 29, 1916.
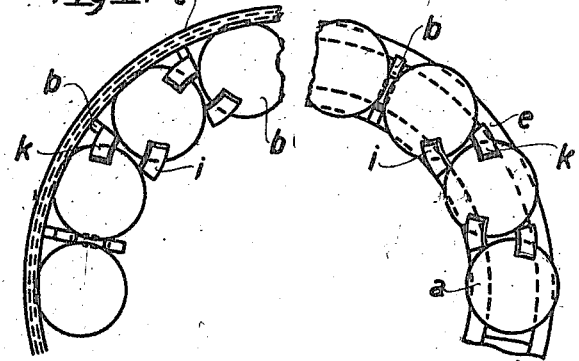
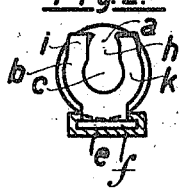
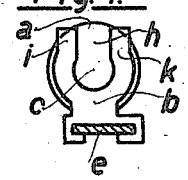
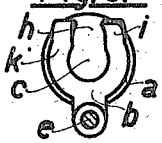
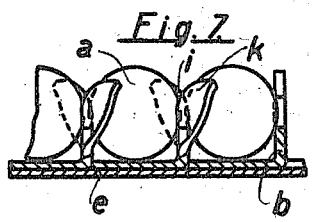
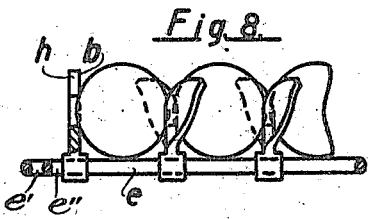
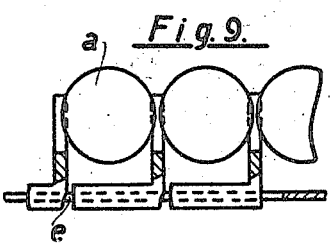
C. G. Söderlund.
Inventor.
By *[signature]*
Attorney.

UNITED STATES PATENT OFFICE.

CARL GUSTAF SÖDERLUND, OF GOTTENBORG, SWEDEN.

SHEET-METAL BALL-RETAINER FOR BALL-BEARINGS.

1,196,605. Specification of Letters Patent. Patented Aug. 29, 1916.

Application filed April 28, 1915. Serial No. 24,431.

*To all whom it may concern:*

Be it known that I, CARL GUSTAF SÖDERLUND, engineer, a subject of the King of Sweden, residing at Gottenborg, in the county of Gottenborg and Bohus and Kingdom of Sweden, have invented new and useful Improvements in and Relating to Sheet-Metal Ball-Retainers for Ball-Bearings, of which the following is a specification.

This invention relates to ball bearings with a single set of balls and has for its object to provide a ball retainer or cage of metal plates, which can easily be inserted into or removed from the bearing.

Another object of my said invention is a ball retainer of sheet metal which permits the bearing to be supplied with considerably more balls than is possible in connection with any other sheet metal ball retainer hitherto known to me.

It is known to use ball cages of thin metal strips situated each between two adjacent balls, bent down toward the balls to prevent them from falling out. Such cages however do not allow the balls to be drawn more closely together than the thickness of metal strips. I am also aware that it has earlier been proposed to make ball cages of wires wound to circular loops adapted to form seats for adjacent balls. The cages of sheet metal however, present a plurality of advantages as compared with those of wire especially in connection with the mode of manufacture, as it has been found easier to construct a cage of sheet metal than of wire, and also to introduce cages of the first mentioned type between the balls and, consequently my improved sheet retainer indicates a distinct advance in connection with ball bearings of the type referred to.

My invention consists therein, that the strips of sheet metal which are interposed each between two adjacent balls, are provided each with a hole of circular or nearly circular shape and adapted to serve as a seat for the adjacent balls, from which hole out to the edge the strip is cut into two wings by a slot, such slot serving as a channel when introducing the balls into the cage.

Referring to the accompanying drawing Figure 1 shows a portion of the cage with the balls inserted and suitable for thrust bearings and Fig. 1ᵃ a similar view suitable for radial bearings. Figs. 2, 3, 4 and 5 illustrate in section four somewhat different modifications of the cage for radial bearings. Fig. 6 a section of the cage for thrust bearings and Figs. 7, 8 and 9 side elevations of a cage partly in section and illustrating three somewhat different forms.

The cage consists in a plurality of metal strips $b$ interposed each between two adjacent balls $a$ and provided each with a circular or nearly circular hole $c$, which surrounds a peripheral portion of each of two adjacent balls $a$, forming a seat for said balls.

The strips $b$ are at equidistant points attached to a ring member $e$ encircling the whole set of balls and which may be constructed in different ways without departing from the spirit of this invention. For instance the strips $b$ consist in angle pieces the foot $f$ of which is attached to the ring member $e$ by the bent over edges of same (Fig. 2). In Fig. 3 there is illustrated another mode of construction according to which the ring member $e$ is replaced by two parallel wires $e'$ $e''$ and the strips $b$ provided with two borings or sleeve shaped portions $g$ adapted to be penetrated by the wires. The ring member $e$ also may be constructed of a single metal strip (Fig. 4) or a single wire (Fig. 5).

The strips $b$ are each cut into two wings $k$ by a slot $h$ from the hole $c$ out to the edge of the strip, which slots are parallel to the axis of the bearing and a little narrower than the diameter of the holes $c$. For thrust bearings the ring member $e$ is situated outside or inside the set of balls, with the strips projecting radially inward or outward respectively, while for radial bearings the ring member $e$ has its place on the one side of the set of balls in a radial plane.

When the cage is ready to be mounted in the bearing, the strips $b$ are still in the same plane. The balls are first placed into their grooves in the bearing and after that the cage is introduced in such a way, that each strip $b$ is forced in between two adjacent balls $a$ during which operation the slots $h$ serve as channels for the balls, guiding them inward to the circular holes $c$. These channels or slots $h$ make it possible to interpose the cage between the balls though the space between them is much less than the thickness of the strips. In fact, the strips can be forced in even when the balls are packed so close together that they nearly touch each other. By tapering the edges of the slot $h$ to fit the surface of the balls the inserting of the strips will be much facilitated.

When in place the cage touches all the balls at three points, viz. at the ring member e and at the two opposite strips b. In order to prevent the balls from falling out the strips are bent down toward the balls, with the two wings i, k of each strip b in opposite directions, each toward its own ball (see Figs. 1, 1ª, 7 and 8). Each ball thus will be embraced by a wing i from one strip b at the one side and a wing k from another strip b at the diametrically opposite side.

I have experienced that my here described ball retainer—owing to the slots h in combination with the circular holes c— allows a bearing of a certain diameter to be supplied with about 17% more balls of the same size than it is possible with any other sheet metal ball cage known to me. For instance, in a bearing with a cage of a known type it was possible to insert only 12 balls of 19 m/m diameter, while I was able to increase the number to 14 balls of the said diameter when using my improved ball retainer, a result, which cannot be reached otherwise and which must be reckoned as an important technical advance, since the usefulness of a ball bearing is in a considerable degree influenced by the number and size of balls in the bearing.

Having thus described and ascertained my invention, what I claim as new and desire to protect by Letters Patent is:

1. A ball retainer, for ball bearings, consisting of a ring member, and a series of metal strips, arranged equidistantly thereon, provided with open ended slots which enable said ring member and strips to be simultaneously placed in position in the bearing with a metal strip between each pair of adjacent balls, the slots being of a sufficient width to allow the balls to project beyond the surfaces of the metal strips and the walls of the slots forming seats for the balls.

2. In a ball bearing a ball retainer comprising a ring member and a series of metal strips arranged equidistantly on said member, each strip being adapted to engage between a pair of adjacent balls and having slots running inward from an edge remote from said ring member, the slots being of a sufficient width to allow the balls to project beyond the surfaces of the metal strips and the walls of the slots forming seats for the balls.

3. In a ball bearing a ball retainer comprising a ring member and a series of metal strips arranged equidistantly on said member, each strip being adapted to engage between a pair of adjacent balls and having slots running inward from the edge opposite to the said ring member, the slots being of sufficient width to allow the balls to project beyond the surfaces of the metal strips and the walls of the slots forming seats for the balls.

4. In a ball bearing a ball retainer comprising a ring member and a series of metal strips arranged equidistantly on said member, each strip being adapted to engage between a pair of adjacent balls and being provided with a central hole the edge of which forms a seat for the two adjacent balls, and also being slotted from said hole to an edge remote from said ring.

5. A ball retainer, for ball bearings, consisting of a ring member and a series of metal strips arranged equidistantly thereon, each of said strips having wings, formed by a slot extending from the center to the edge of the strip, adapted to be bent down in opposite directions toward adjacent balls when the retainer is in position with a strip located between each pair of adjacent balls, the slots being of a sufficient width to allow the balls to project beyond the surfaces of the metal strips and the walls of the slots forming seats for the balls.

6. A ball retainer, for ball bearings having a single set of balls, comprising a ring member, metal strips attached at equidistant points to said member around the set of balls and provided each with a circular hole the edge of which constitutes a seat for the adjacent balls, and also divided into two wings by a slot from said hole out to the edge of the metal strip, said wings being bent down in opposite directions toward adjacent balls so that each ball rests embraced between two diametrically opposed bent down wings.

In testimony whereof I have hereunto set my hand in presence of two subscribing witnesses.

CARL GUSTAF SÖDERLUND.

Witnesses:
   Eric Midhalne,
   Larin Lizchas.